United States Patent
Sah et al.

(10) Patent No.: US 10,365,737 B2
(45) Date of Patent: Jul. 30, 2019

(54) TOUCH INPUT DEVICE

(71) Applicant: HYUNDAI MOTOR COMPANY, Seoul (KR)

(72) Inventors: Sung Jin Sah, Suwon-si (KR); Kwang Myung Oh, Suwon-si (KR); Sung Min Park, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 91 days.

(21) Appl. No.: 15/372,067

(22) Filed: Dec. 7, 2016

(65) Prior Publication Data

US 2017/0220143 A1 Aug. 3, 2017

(30) Foreign Application Priority Data

Jan. 29, 2016 (KR) .................. 10-2016-0011440

(51) Int. Cl.
*G06F 3/041* (2006.01)

(52) U.S. Cl.
CPC ............ *G06F 3/041* (2013.01); *G06F 3/0414* (2013.01); *G06F 2203/04101* (2013.01); *G06F 2203/04105* (2013.01)

(58) Field of Classification Search
CPC combination set(s) only.
See application file for complete search history.

(56) References Cited

U.S. PATENT DOCUMENTS

| | | | |
|---|---|---|---|
| 5,038,142 A | 8/1991 | Flower et al. | |
| 2002/0175836 A1 | 11/2002 | Roberts | |
| 2011/0037726 A1* | 2/2011 | Lee | G06F 3/0414 345/174 |
| 2011/0051334 A1* | 3/2011 | Griffith | G06F 3/03547 361/679.01 |
| 2013/0342501 A1 | 12/2013 | Molne et al. | |

(Continued)

FOREIGN PATENT DOCUMENTS

| | | |
|---|---|---|
| JP | 2015-207092 A | 11/2015 |
| KR | 10-2003-0088137 A | 11/2003 |

(Continued)

*Primary Examiner* — Temesghen Ghebretinsae
*Assistant Examiner* — Sosina Abebe
(74) *Attorney, Agent, or Firm* — Morgan Lewis & Bockius LLP (57) ABSTRACT

A touch input device includes: a touch plate having a first surface facing in a first direction, and a second surface facing in a second direction opposing the first direction; at least one elastic member connected to the second surface of the touch plate, and deformed in at least one of the first direction and the second direction when a touch is applied to the first surface of the touch plate; and a plurality of sensors connected to the at least one elastic member and detecting when the elastic member is deformed to sense the touch. The plurality of sensors are disposed to be inwardly spaced apart from end edges of the touch plate, and output a first signal when a sensor among the plurality of sensors senses that one point of the touch plate is pulled in the first direction and a second signal when the one point of the touch plate is pushed in the second direction, and the touch plate has a plurality of touch areas divided by a plurality of imaginary lines connecting the plurality of sensors to each other virtually.

13 Claims, 6 Drawing Sheets

(56) References Cited

U.S. PATENT DOCUMENTS

2014/0320452 A1* 10/2014 Kim .................. G06F 3/0414
                                                    345/174
2015/0185769 A1*  7/2015 Takata ................ G06F 1/169
                                                    345/173
2017/0024049 A1*  1/2017 Tachikawa ............ G06F 3/044

FOREIGN PATENT DOCUMENTS

KR    10-2013-0085207 A    7/2013
KR    10-2014-0129812 A    11/2014

* cited by examiner

TOUCH INPUT DEVICE

CROSS-REFERENCE TO RELATED APPLICATION

This application claims the benefit of priority to Korean Patent Application No. 10-2016-0011440, filed on Jan. 29, 2016 in the Korean Intellectual Property Office, the entire disclosure of which is incorporated herein by reference.

TECHNICAL FIELD

The present disclosure relates to a touch input device and, more particularly, to a touch input device with an expanded touch sensing area and an increased degree of freedom of design for a structure such as a sensor sensing a touch.

BACKGROUND

A touch input device is a user interface where a user can input user operations simply and intuitively by touching a display surface or a designated touch surface with a finger, an electronic pen, or the like. Touch input devices may be applied to various technical fields, such as navigation devices, telematics terminals, personal digital assistants (PDAs), laptop computers, notebook computers, smartphones, and others.

Touch input devices use a variety of touch sensing technologies including resistive overlay, capacitive overlay, surface acoustic wave (SAW), and infrared beam. Conventional touch sensing technologies may sense touch coordinates, i.e., X-axis and Y-axis coordinates on the flat surface of a panel, and thus, they may be limited to two-dimensional (2D) touch interaction.

In order to overcome the limit of conventional 2D touch interaction, a force-based touch sensing technology (three-dimensional (3D) touch interaction) that senses the force of a touch using a force sensor together with touch coordinates has been proposed.

Furthermore, a conventional touch input device has a plurality of force sensors attached to the bottom surface of a touch panel. When a touch is applied to the touch panel, the sensors are used for various purposes, such as sensing the position, intensity, and the like of the touch.

A conventional touch input device is only capable of sensing a touch in an area inside a virtually connected border by the plurality of force sensors attached to the bottom of end edges of the touch panel, however, and is not capable of sensing a touch in an area outside of the border. That is, when the force sensors are attached to the end edges of the touch panel, the touch sensing area may be narrowed.

In particular, when the touch input device is applied to various apparatuses, various curved surface structures, various conditions, and the like, it may be difficult to expand the touch sensing area.

SUMMARY

The present disclosure has been made to solve the above-mentioned problems occurring in the prior art while advantages achieved by the prior art are maintained intact.

An aspect of the present disclosure provides a touch input device expanding a touch sensing area and increasing the degree of freedom of design, such as regarding the positions or the like of sensors sensing a touch and other elements.

According to an aspect of the present disclosure, a touch input device includes: a touch plate having a first surface facing in a first direction, and a second surface facing in a second direction opposing the first direction; at least one elastic member connected to the second surface of the touch plate, and deformed in at least one of the first direction and the second direction when a touch is applied to the first surface of the touch plate; and at least one sensor connected to the elastic member and detecting deformation of the elastic member to sense the touch, wherein the sensor is disposed to be inwardly spaced apart from an end edge of the touch plate.

The sensor may be a strain gauge measuring a force when it is subjected to bending in response to the deformation of the elastic member in the first direction or the second direction.

The elastic member may be a cantilever structure connected to the second surface of the touch plate.

A first end of the elastic member may be connected to the second surface of the touch plate, and a second end of the elastic member may be supported by a support member.

A protrusion may protrude from the second surface of the touch plate in the second direction, and the first end of the elastic member may be fixed to the protrusion.

The touch input device may further include a base plate spaced apart from the second surface of the touch plate, and the support member may protrude from the base plate in the first direction.

A connecting bracket may be coupled to the first end of the elastic member, and the connecting bracket may be fixed to the protrusion.

The connecting bracket may have a groove to which the first end of the elastic member is fitted.

The connecting bracket may have at least one pressing protrusion pressing the first end of the elastic member.

The connecting bracket may have an insertion portion passing through the first end of the elastic member, an upper pressing portion provided at a top of the insertion portion, and a lower pressing portion provided at a bottom of the insertion portion.

The connecting bracket may be a fastening screw having a head portion and a screw portion, and a fastening hole may be provided in the first end of the elastic member. The screw portion of the connecting bracket may be screw-coupled to the fastening hole of the elastic member.

A wedge portion may protrude from one side of the protrusion, and the first end of the elastic member may be provided with a wedge groove to which the wedge portion is wedge-coupled.

A coupling portion may be provided on one side of the protrusion while having a stepped shape, and the first end of the elastic member may be provided with a coupling groove to which the coupling portion is fitted.

According to another aspect of the present disclosure, a touch input device includes: a touch plate; and at least one sensor connected to a bottom surface of the touch plate, disposed to be inwardly spaced apart from an end edge of the touch plate, and measuring a force caused by a touch applied to the touch plate.

The touch plate may have a flat structure.

The touch plate may have a curved structure.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. For reference, the dimensions of elements, thicknesses of lines, and the like, illustrated in the drawings referred to in the description of exemplary embodiments of the present disclosure, may be exaggerated for convenience of understanding. Terms used for describing the present inventive concept have been defined in consideration of the functions of elements, and may be altered in accordance with the intention of a user or an operator, in view of practice, or the like. Therefore, the terms should be defined on the basis of the entirety of this specification.

Figure 1:
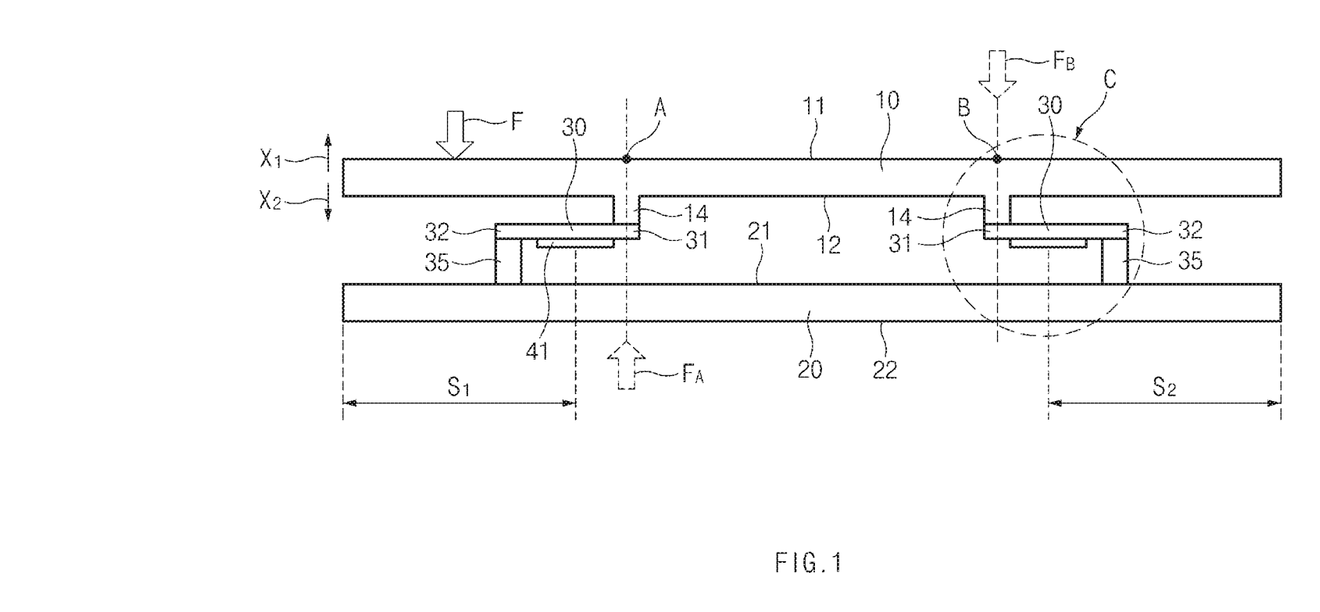
FIG. 1 illustrates a touch input device, according to an exemplary embodiment in the present disclosure.

Referring to FIG. 1, a touch input device, according to an exemplary embodiment in the present disclosure, includes a touch plate 10.

The touch plate 10 may have a first surface 11 facing in a first direction X1 and a second surface 12 facing in a second direction X2 opposing the first direction X1.

In FIG. 1, the first surface 11 may be a top surface to which a touch is applied, and the second surface 12 may be a bottom surface opposing the first surface 11. The second surface 12 may receive a force acting in the first direction X1 or the second direction X2 from the touch applied to the first surface 11.

A base plate 20 may be disposed to be spaced apart from the second surface 12 of the touch plate 10 in the second direction.

The base plate 20 may have a first surface 21 facing in the first direction X1 and a second surface 22 facing in the second direction X2 opposing the first direction X1. The first surface 21 of the base plate 20 may be disposed to face the second surface 12 of the touch plate 10.

At least one sensor 41 sensing a touch may be connected to the second surface 12 of the touch plate 10 through at least one elastic member 30.

The elastic member 30 may be connected to the second surface 12 of the touch plate 10, and the elastic member 30 may be deformed in at least one of the first direction X1 and the second direction X2 due to the touch applied to the first surface 11 of the touch plate 10.

Specific structural details of the elastic member 30 will be described with reference to FIG. 2.

Figure 2:
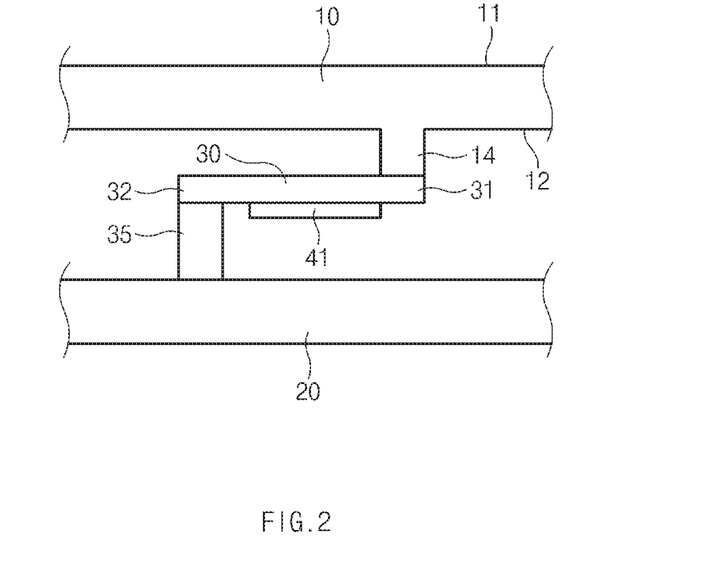
FIG. 2 illustrates an enlarged view of a portion of the touch input device indicated by arrow C of FIG. 1.

As illustrated in FIG. 2, a protrusion 14 may be formed to protrude from the second surface 12 of the touch plate 10 toward the second direction X2, and a support member 35 may be disposed to protrude from the first surface 21 of the base plate 20 toward the first direction X1.

The protrusion 14 and the support member 35 may be disposed to be spaced apart from each other in a direction perpendicular to the first direction X1 and the second direction X2 (i.e., a horizontal direction in FIG. 1). One end 31 of the elastic member 30 may be fixed to the protrusion 14 using an adhesive or the like such that it may be connected to the second surface 12 of the touch plate 10. The other end 32 of the elastic member 30 may be fixed to the support member 35 such that it may be connected to the first surface 21 of the base plate 20. In particular, the elastic member 30 may be disposed to be flat in the horizontal direction, and in order to maintain the horizontality of the elastic member 30, the bottom of the protrusion 14 may be extended to have a length corresponding to one end 31 of the elastic member 30, and the top of the support member 35 may be extended to have a length corresponding to the other end 32 of the elastic member 30.

When a touch is applied to a point on the first surface 11 of the touch plate 10, the elastic member 30 may behave as a cantilever, in which one end of the elastic member 30 is deformed in at least one of the first direction X1 and the second direction X2 in relation to the other end of the elastic member 30. In other words, the elastic member 30 may be a cantilever structure connected to the second surface 12 of the touch plate 10, and the cantilever behavior of the elastic member 30 may enable the bending of the sensor 41 stably and smoothly.

Here, the force caused by the touch may be smoothly transferred to one end 31 of the elastic member 30 through the protrusion 14 protruding from the second surface 12 of the touch plate 10. Since the elastic member 30 is spaced apart from the second surface 12 of the touch plate 10 by a predetermined gap through the protrusion 14, the touch applied to the touch plate 10 may stably deform the elastic member 30.

FIGS. 3 to 8 illustrate modified structures of the elastic member 30 of FIG. 2, according to exemplary embodiments in the present disclosure.

Figure 3:
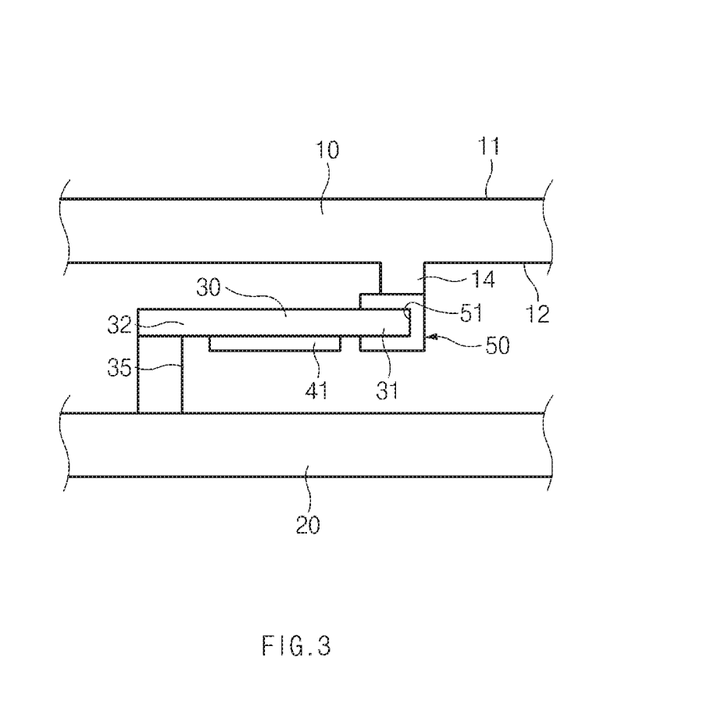
FIG. 3 illustrates a modified structure of the touch input device of FIG. 2, according to another exemplary embodiment.

According to the exemplary embodiment of FIG. 3, a connecting bracket 50 may be connected to one end 31 of the elastic member 30, and the connecting bracket 50 may be a structure having a U-shaped groove 51. One end 31 of the elastic member 30 may be inserted into the groove 51 of the connecting bracket 50. The top of the connecting bracket 50 may be fixed to the bottom of the protrusion 14 using an adhesive or the like.

The force caused by the touch applied to the touch plate 10 may be more smoothly transferred to one end 31 of the elastic member 30 through the connecting bracket 50, such that the elastic member 30 may be stably deformed.

Figure 4:
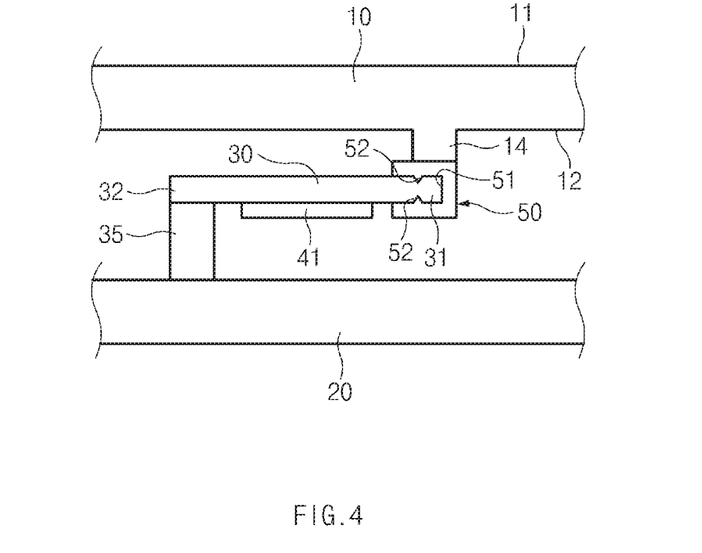
FIG. 4 illustrates a modified structure of the touch input device of FIG. 2, according to another exemplary embodiment.

According to the exemplary embodiment of FIG. 4, the connecting bracket 50 may have one or more pressing protrusions 52 pressing one end 31 of the elastic member 30, and the pressing protrusions 52 may be disposed to face each other within the groove 51 of the connecting bracket 50 to thereby press one end 31 of the elastic member 30 more firmly.

Figure 5:
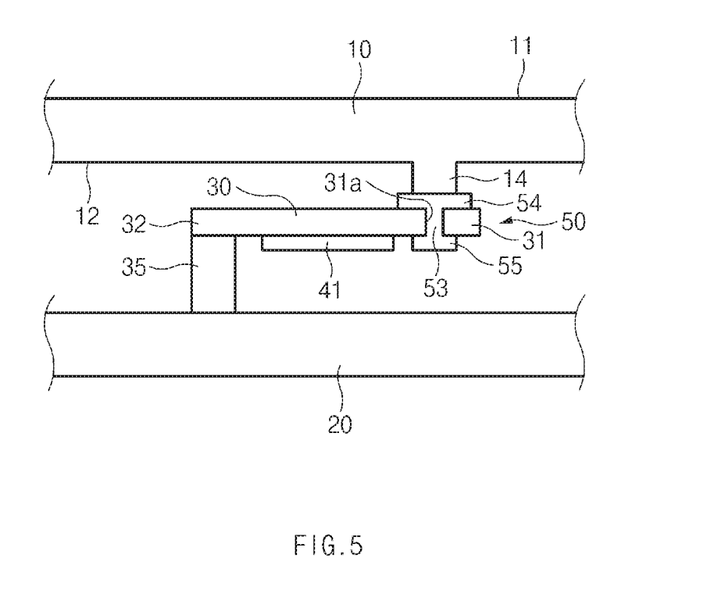
FIG. 5 illustrates a modified structure of the touch input device of FIG. 2, according to another exemplary embodiment.

According to the exemplary embodiment of FIG. 5, the connecting bracket 50 may have an insertion portion 53 passing through one end 31 of the elastic member 30, an upper pressing portion 54 provided at the top of the insertion portion 53, and a lower pressing portion 55 provided at the bottom of the insertion portion 53. A through hole 31a may be formed in one end 31 of the elastic member 30. The insertion portion 53 of the connecting bracket 50 may be inserted into the insertion hole 31a of the elastic member 30, and the upper pressing portion 54 and the lower pressing portion 55 may press one end 31 of the elastic member 30 in the vertical direction, such that the connecting bracket 50 may be firmly coupled to one end 31 of the elastic member 30.

Figure 6:
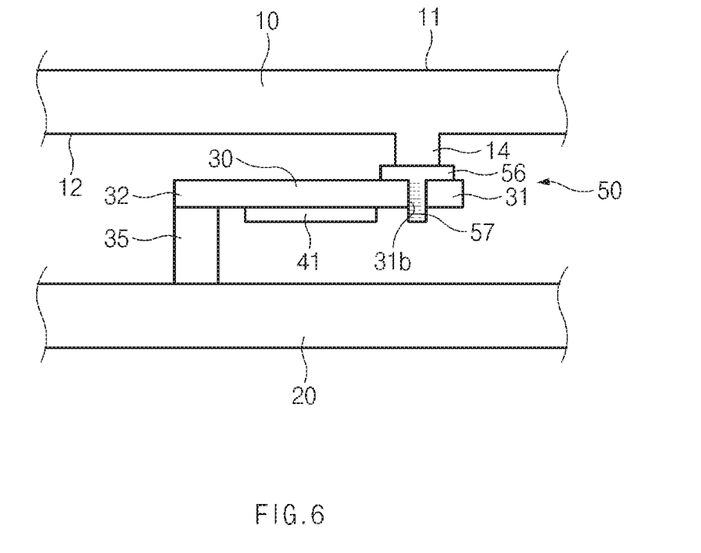
FIG. 6 illustrates a modified structure of the touch input device of FIG. 2, according to another exemplary embodiment.

According to the exemplary embodiment of FIG. 6, the connecting bracket 50 may be a fastening screw having a head portion 56 and a screw portion 57. The top of the head portion 56 may be fixed to the bottom of the protrusion 14 using an adhesive or the like. A fastening hole 31b may be formed in one end 31 of the elastic member 30, and the screw portion 57 of the connecting bracket 50 may be screw-coupled to the fastening hole 31b of the elastic member 30.

Figure 7:
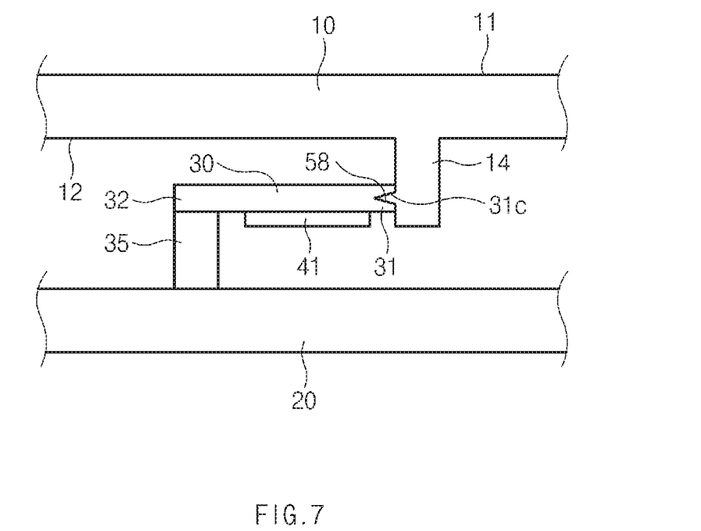
FIG. 7 illustrates a modified structure of the touch input device of FIG. 2, according to another exemplary embodiment.

According to the exemplary embodiment of FIG. 7, the protrusion 14 may have a wedge portion 58 protruding from one side thereof, and a wedge groove 31c may be formed in one end 31 of the elastic member 30. Thus, the wedge portion 58 of the protrusion 14 may be wedge-coupled to the wedge groove 31c of the elastic member 30.

Figure 8:
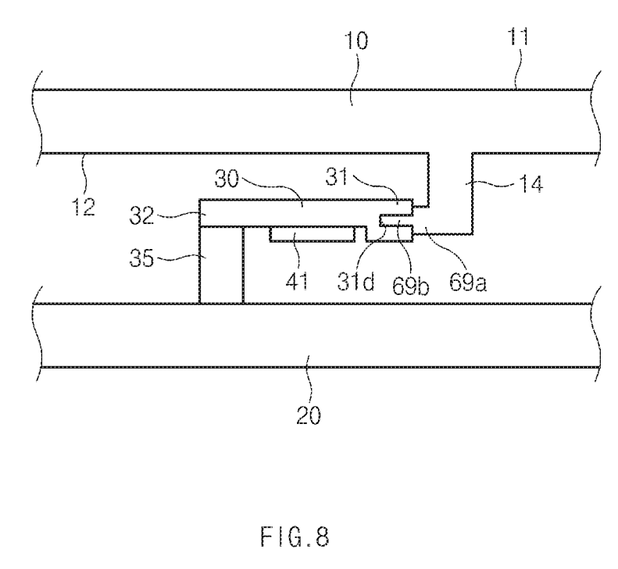
FIG. 8 illustrates a modified structure of the touch input device of FIG. 2, according to another exemplary embodiment.

According to the exemplary embodiment of FIG. 8, the protrusion 14 may have a horizontal portion 69a extending from one side thereof in the horizontal direction and a coupling portion 69b formed in a stepped shape while protruding from the horizontal portion 69a, and a coupling groove 31d may be formed in one end 31 of the elastic member 30. Thus, the coupling portion 69b of the protrusion 14 may be fitted to the coupling groove 31d of the elastic member 30.

The sensor 41 may be attached to the elastic member 30, and may measure the force caused by the touch applied to the first surface 11 of the touch plate 10 in response to the deformation of the elastic member 30. In other words, the elastic member 30 may transfer the force caused by the touch to the sensor 41.

As described above, the sensor 41 may sense the deformation of the elastic member 30 by the touch applied to the touch plate 10, and measure the force of the touch, thereby recognizing the position coordinates, intensity, and the like of the touch.

According to an exemplary embodiment, the sensor 41 may be a strain gauge measuring a force as it is subjected to bending in response to the deformation of the elastic member 30 in the first direction X1 or the second direction X2.

In particular, as illustrated in FIG. 1, one or more sensors 41 may be disposed to be inwardly spaced apart from end edges of the touch plate 10 (see $S_1$ and $S_2$ in FIG. 1), and thus, the sensors 41 may be capable of accurately measuring the deformation of the elastic member 30 in the first direction X1 or the second direction X2 caused by the touch. This may facilitate the touch sensing throughout the entirety of the first surface 11 of the touch plate 10, and thus, a touch sensing area may be significantly expanded.

As illustrated in FIG. 1, when two sensors 41 are inwardly spaced apart from the end edges of the touch plate 10 by gaps $S_1$ and $S_2$, when a touch of external force F is applied to one point close to the end edge of the touch plate 10 in the second direction X2, the touch plate 10 may act as a lever using point A as a supporting point, and thus, a first reaction force $F_A$ may be generated at point A in the first direction X1, and a second reaction force $F_B$ may be generated at point B in the second direction X2. As point A of the touch plate 10 is pulled in the first direction X1, a signal sensed by the sensor 41 positioned at point A may be output, and as point B of the touch plate 10 is pushed in the second direction X2, a signal sensed by the sensor 41 positioned at point B may be output. Thus, the sensors 41 may measure the forces $F_A$ and $F_B$ generated at respective points. By measuring the forces applied to the sensors 41 and using a distance between the sensors 41 in force and moment equilibrium equations, the coordinates, intensity, and the like of the touch may be determined.

Furthermore, according to the related art, as force sensors may be attached to the bottom of the end edge of the touch panel, the force sensors only output a signal that is sensed when the touch panel is pushed in the second direction, and determine a signal that is sensed when the touch panel is pulled in the first direction as a noise signal, and thus, there is a limit in touch sensing. On the contrary, according to exemplary embodiments of the present disclosure, as the sensors 41 are disposed to be inwardly spaced apart from the end edges of the touch plate 10, they output the signal that is sensed when one point of the touch plate 10 is pulled in the first direction X1, as well as the signal that is sensed when one point of the touch plate 10 is pushed in the second direction X2, and thus, the touch sensing may be more accurate and the touch sensing area may be expanded.

Figure 9:
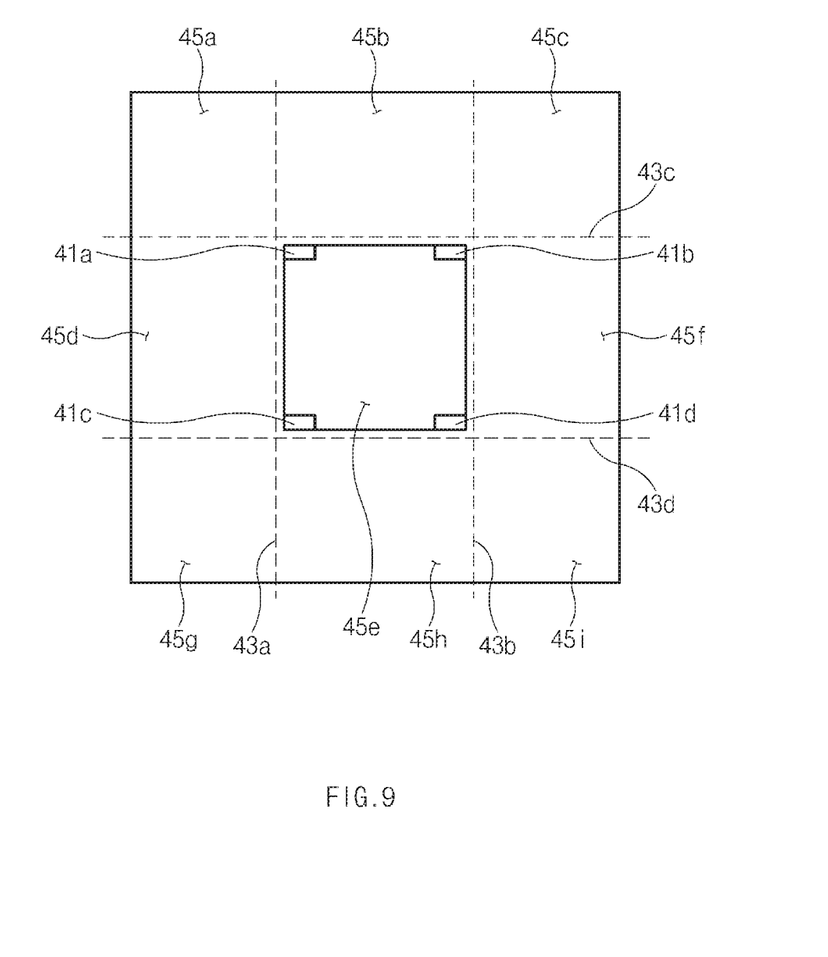
FIG. 9 illustrates a plan view of the touch input device of FIG. 1.

FIG. 9 illustrates an exemplary arrangement in which a plurality of sensors 41a, 41b, 41c, and 41d are disposed to be inwardly spaced apart from the end edges of the touch plate 10. The touch plate 10 may have a plurality of touch areas 45a, 45b, 45c, 45d, 45e, 45f, 45g, 45h, and 45i divided by a plurality of imaginary lines 43a, 43b, 43c, and 43d connecting the plurality of sensors 41a, 41b, 41c, and 41d to each other virtually.

For convenience of explanation, the plurality of touch areas include a first touch area 45a, a second touch area 45b, a third touch area 45c, a fourth touch area 45d, a fifth touch area 45e, a sixth touch area 45f, a seventh touch area 45g, an eighth touch area 45h, and a ninth touch area 45i, and the plurality of sensors include a first sensor 41a, a second sensor 41b, a third sensor 41c, and a fourth sensor 41d. In addition, a signal that is sensed when each of the touch areas 45a, 45b, 45c, 45d, 45e, 45f, 45g, 45h, and 45i is pushed in the second direction may be a positive (+) signal, and a signal that is sensed when each of the touch areas 45a, 45b, 45c, 45d, 45e, 45f, 45g, 45h, and 45i is pulled in the first direction may be a negative (−) signal.

When a touch is applied to the first touch area 45a and the first touch area 45a is pushed in the second direction, the first sensor 41a that is the closest sensor to the first touch area 45a may output a strong positive (+) signal, and the fourth sensor 41d that is positioned on the opposite side of the first touch area 45a diagonally may output a strong negative (−) signal. In addition, since the second sensor 41b and the third sensor 41c are only slightly affected by the touch applied to the first touch area 45a, they may not output any signals.

When a touch is applied to the second touch area 45b and the second touch area 45b is pushed in the second direction, the first sensor 41a and the second sensor 41b that are close to the second touch area 45b may output weak positive (+) signals, and the third sensor 41c and the fourth sensor 41d that are positioned on the opposite side of the second touch area 45b may output weak negative (−) signals.

When a touch is applied to the third touch area 45c and the third touch area 45c is pushed in the second direction, the second sensor 41b that is the closest sensor to the third touch area 45c may output a strong positive (+) signal, and the third sensor 41c that is positioned on the opposite side of the third touch area 45c diagonally may output a strong negative (−) signal. In addition, since the first sensor 41a and the fourth sensor 41d are only slightly affected by the touch applied to the third touch area 45c, they may not output any signals.

When a touch is applied to the fourth touch area 45d and the fourth touch area 45d is pushed in the second direction, the first sensor 41a and the third sensor 41c that are close to the fourth touch area 45d may output weak positive (+) signals, and the second sensor 41b and the fourth sensor 41d that are positioned on the opposite side of the fourth touch area 45d may output weak negative (−) signals.

When a touch is applied to the fifth touch area 45e and the fifth touch area 45e is pushed in the second direction, all of the plurality of sensors 41a, 41b, 41c, and 41d may output positive (+) signals.

When a touch is applied to the sixth touch area 45f and the sixth touch area 45f is pushed in the second direction, the second sensor 41b and the fourth sensor 41d that are close to the sixth touch area 45f may output weak positive (+) signals, and the first sensor 41a and the third sensor 41c that are positioned on the opposite side of the sixth touch area 45f may output weak negative (−) signals.

When a touch is applied to the seventh touch area 45g and the seventh touch area 45g is pushed in the second direction, the third sensor 41c that is the closest sensor to the seventh touch area 45g may output a strong positive (+) signal, and the second sensor 41b that is positioned on the opposite side of the seventh touch area 45g diagonally may output a strong negative (−) signal. In addition, since the first sensor 41a and the fourth sensor 41d are only slightly affected by the touch applied to the seventh touch area 45g, they may not output any signals.

When a touch is applied to the eighth touch area 45h and the eighth touch area 45h is pushed in the second direction, the third sensor 41c and the fourth sensor 41d that are close to the eighth touch area 45h may output weak positive (+) signals, and the first sensor 41a and the second sensor 41b that are positioned on the opposite side of the eighth touch area 45h may output weak negative (−) signals.

When a touch is applied to the ninth touch area 45i and the ninth touch area 45i is pushed in the second direction, the fourth sensor 41d that is the closest sensor to the ninth touch area 45i may output a strong positive (+) signal, and the first sensor 41a that is positioned on the opposite side of the ninth touch area 45i diagonally may output a strong negative (−) signal. In addition, since the second sensor 41b and the third sensor 41c are only slightly affected by the touch applied to the ninth touch area 45i, they may not output any signals.

According to an exemplary embodiment, the touch plate 10 may be formed of various materials such as a synthetic resin or a glass material, and the touch plate 10 may be a flat plate structure of which the first and second surfaces 11 and 12 are flat.

According to another exemplary embodiment, the touch plate 10 may be a curved plate structure of which the first surface 11 or the second surface 12 is curved, such as a button or a protrusion.

In addition, the touch plate 10 may be at least one of a touch panel, a touch screen, and a touch pad using touch sensing technologies such as resistive overlay, capacitive overlay, surface acoustic wave (SAW), and infrared beam, and the touch plate 10 may detect the coordinates and the like of the touch applied to the first surface 11.

As described above, the sensors 41 may be disposed to be inwardly spaced apart from the end edges of the touch plate 10 (see $S_1$ and $S_2$ in FIG. 1), and thus, this may facilitate the touch sensing throughout the entirety of the first surface 11 of the touch plate 10. In other words, the touch sensing area may be expanded. The expansion of the touch sensing area may increase the degree of freedom of design of various structures such as the sensor 41 and the base plate 20.

Since the sensors 41 are capable of accurately measuring the deformation of the elastic member 30 in the first direction X1 or the second direction X2, a pull-type touch input structure with a button, a protrusion, or the like, in addition to a conventional push-type touch input structure, may be made.

In the exemplary embodiments of the present disclosure, the touch plate 10 is disposed in the first direction X1 in relation to the sensors 41. Alternatively, the touch plate 10 may also be disposed in the second direction X2 in relation to the sensors 41. Even if the touch plate 10 is disposed in both the first direction X1 and the second direction X2 in relation to the sensors 41, there is no need to provide a separate sensor, and a structure capable of detecting push-pull type touch inputs may be made.

In addition, when the plurality of sensors 41 are disposed to be inwardly spaced apart from the end edges of the touch plate 10, the lever action of the touch plate 10 may be performed smoothly, and thus, the touch sensing area may be significantly expanded through the movements of the elastic member 30 in the first direction X1 and the second direction X2.

As set forth above, the sensors may be disposed to be inwardly spaced apart from the end edges of the touch plate, and thus, this may facilitate the touch sensing throughout the entirety of the first surface of the touch plate. In other words, the touch sensing area may be expanded. The expansion of the touch sensing area may increase the degree of freedom of design of various structures such as the sensor and the base plate.

In addition, the sensors may be capable of accurately measuring the deformation of the elastic member in the first direction or the second direction, and thus, push-pull type touch inputs may be effectively made.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A touch input device, comprising:
    a touch plate having a first surface facing in a first direction, and a second surface facing in a second direction opposing the first direction;
    a plurality of elastic members each connected to the second surface of the touch plate, and deformed in at least one of the first direction and the second direction when a touch is applied to the first surface of the touch plate; and
    a plurality of sensors each attached directly to a respective one of the plurality of elastic members and detecting when the respective one of the plurality of elastic members is deformed to sense the touch,
    wherein the plurality of sensors are disposed to be inwardly spaced apart from end edges of the touch plate, and output a first signal when a sensor among the plurality of sensors senses that one point of the touch plate is pulled in the first direction and a second signal when the one point of the touch plate is pushed in the second direction, the touch plate has a plurality of touch areas divided by a plurality of imaginary lines connecting the plurality of sensors to each other virtually, a first end of each of the plurality of elastic members is connected to the second surface of the touch plate, a second end of each of the plurality of elastic members is supported by a support member, a protrusion protrudes from the second surface of the touch plate in the second direction, and the first end of each of the plurality of elastic members is fixed to the protrusion.

2. The touch input device according to claim 1, wherein each of the plurality of sensors is a strain gauge measuring a force when it is subjected to bending when each of the plurality of elastic members is deformed in the first direction or the second direction.

3. The touch input device according to claim 1, wherein each of the plurality of elastic members is a cantilever structure connected to the second surface of the touch plate.

4. The touch input device according to claim 1, further comprising a base plate spaced apart from the second surface of the touch plate, wherein the support member protrudes from the base plate in the first direction.

5. The touch input device according to claim 1, wherein a connecting bracket is coupled to the first end of each of the plurality of elastic members, and the connecting bracket is fixed to the protrusion.

6. The touch input device according to claim 5, wherein the connecting bracket has a groove to which the first end of each of the plurality of elastic members is fitted.

7. The touch input device according to claim 5, wherein the connecting bracket has at least one pressing protrusion pressing the first end of each of the plurality of elastic members.

8. The touch input device according to claim 5, wherein the connecting bracket has an insertion portion passing through the first end of each of the plurality of elastic members, an upper pressing portion provided at a top of the insertion portion, and a lower pressing portion provided at a bottom of the insertion portion.

9. The touch input device according to claim 5, wherein the connecting bracket is a fastening screw having a head portion and a screw portion, a fastening hole is provided in the first end of each of the plurality of elastic members, and the screw portion of the connecting bracket is screw-coupled to the fastening hole of each of the plurality of elastic members.

10. The touch input device according to claim 1, wherein a wedge portion protrudes from one side of the protrusion, and the first end of each of the plurality of elastic members is provided with a wedge groove to which the wedge portion is wedge-coupled.

11. The touch input device according to claim 1, wherein a coupling portion is provided on one side of the protrusion while having a stepped shape, and the first end of each of the plurality of elastic members is provided with a coupling groove to which the coupling portion is fitted.

12. The touch input device according to claim 1, wherein the touch plate has a flat structure.

13. The touch input device according to claim 1, wherein the touch plate has a curved structure.

* * * * *